United States Patent
Li et al.

(10) Patent No.: US 7,300,227 B2
(45) Date of Patent: Nov. 27, 2007

(54) RECOVERY OF NON-AQUEOUS PHASE LIQUIDS FROM GROUND SOURCES

(76) Inventors: Tommy M. W. Li, 158 Brunswick St., Apt. 3C, Fredericton, New Brunswick (CA) E3B 1G6; Marios Ioannidis, 531 Mayflower Street, Waterloo, Ontario (CA) N2K 3Y7; Ioannis Chatzis, 94 Amos Avenue, Waterloo, Ontario (CA) N2L 5C4

(*) Notice: Subject to any disclaimer, the term of this patent is extended or adjusted under 35 U.S.C. 154(b) by 0 days.

(21) Appl. No.: 11/179,466

(22) Filed: Jul. 13, 2005

(65) Prior Publication Data

US 2007/0014633 A1    Jan. 18, 2007

(51) Int. Cl.
*B09C 1/02* (2006.01)

(52) U.S. Cl. .............................. 405/128.1; 405/128.45; 210/747

(58) Field of Classification Search ............. 405/128.1, 405/128.25, 128.45, 128.75
See application file for complete search history.

(56) References Cited

U.S. PATENT DOCUMENTS

| | | | | |
|---|---|---|---|---|
| 4,832,122 A | * | 5/1989 | Corey et al. ................ | 166/266 |
| 5,389,267 A | * | 2/1995 | Gorelick et al. ............. | 210/758 |
| 6,689,262 B2 | * | 2/2004 | Senkiw ..................... | 204/278.5 |
| 2003/0175081 A1 | * | 9/2003 | Shiau ....................... | 405/128.7 |
| 2005/0279713 A1 | * | 12/2005 | Osborn et al. .............. | 210/760 |

FOREIGN PATENT DOCUMENTS

| | | | | |
|---|---|---|---|---|
| EP | 412472 | A | * | 2/1991 |
| JP | 10216696 | A | * | 8/1998 |

* cited by examiner

*Primary Examiner*—John Kreck
(74) *Attorney, Agent, or Firm*—J. Wayne Anderson

(57) ABSTRACT

The invention disclosed relates to a method and apparatus for recovering non-aqueous phase liquids (NAPL) from regions below ground where NAPL spills are sources of aquifer contamination. The apparatus includes a system to supply gas-supersaturated liquid, a system of ground wells in fluid communication with the contaminated ground water region (source of contamination) and with an above-ground NAPL recovery system, said system of wells including an injection well in fluid communication with the system to supply gas-supersaturated liquid and with the contaminated region below ground, an extraction well in fluid communication with the contaminated region below ground and with the NAPL recovery system, wherein the NAPL is in the gaseous phase or gas-mobilized non-volatile liquid phase or both, and a pump for delivering the gas-supersaturated liquid to the vicinity of the contaminated region below ground.

12 Claims, 9 Drawing Sheets

RECOVERY OF NON-AQUEOUS PHASE LIQUIDS FROM GROUND SOURCES

BACKGROUND OF THE INVENTION

This invention relates to the recovery of non-aqueous phase liquids (NAPL) from ground sources contaminated therewith, and in particular to a method and apparatus for such recovery, by injection of a gas-supersaturated liquid into the region of ground source of contamination, using a system of wells and a NAPL recovery system at the surface.

NAPL such as gasoline spills, halogenated solvents and other volatile petroleum products, are common groundwater contaminants. Dense NAPL can migrate below the water table and become trapped in the water-saturated zone, held in place by capillary forces. Since NAPL have very low solubility in water, the trapped NAPL can be a long term source of contamination of groundwater for many-many years. A schematic of trapped NAPL pool beneath the water table in an aquifer can be seen in FIG. 1.

Air sparging is a common remediation technique, seeking to capitalize on the relatively high NAPL volatility. However, this method is often very ineffective, primarily because the injected air tends to finger-through and by-pass most of the contaminated zone under the combined action of buoyancy and capillary forces. Air sparging is an immiscible displacement process and the capillary forces prevailing in the porous media will restrict gas flow through much of the pore space. As a result, the air-sparging method fails to achieve direct contact between most of the free-phase NAPL and the injected air, and its performance is severely compromised by mass transfer resistances in the aqueous phase. A schematic of this phenomenon is visualized in FIG. 2.

According to the invention disclosed in our prior U.S. Pat. No. 6,209,855 of 3 Apr. 2001, a method and apparatus are provided to produce a gas/liquid mixture which, when compared to known gas/liquid mixtures, has a) a surprisingly greater mass of gas dissolved in a given volume of liquid, to the point of super-saturation, and b) exhibits a vastly increased period during which gas remains dissolved in the liquid, before it nucleates and exits the liquid in the form of bubbles.

SUMMARY OF THE INVENTION

According to one aspect of the invention, an apparatus is provided for recovering non-aqueous phase liquids (NAPL) from a contaminated groundwater region, comprising, (a) a system to supply a gas-supersaturated liquid, a system of wells drilled into the ground such that they are in fluid communication with the contaminated ground-water region and with an above-ground NAPL-recovery system, said system of wells including an injection well in fluid communication with the system to supply gas-supersaturated liquid and with the contaminated ground-water region, an extraction well in fluid communication with the contaminated ground-water region and with the NAPL recovery system, and a pump for delivering the gas-supersaturated liquid to the vicinity of the contaminated ground-water region.

According to another aspect of the invention, a method is provided for recovering non-aqueous phase liquids (NAPL) from a contaminated ground-water region, comprising (a) providing a system to supply gas supersaturated liquid, a system of ground wells in fluid communication with the contaminated ground-water region and with an above-ground NAPL recovery system, said system of wells including an injection well in fluid communication with the system to supply gas-supersaturated liquid and with the contaminated ground-water region and an extraction well in fluid communication with the NAPL recovery system, (b) injecting a gas-supersaturated liquid into the vicinity of the contaminated ground-water region through the gas injection well, wherein the NAPL is held in the pores of a porous medium in the contaminated ground-water region, resulting in the flow of the gas-supersaturated liquid to displace the NAPL held in the pores via lifting some of the NAPL by rising gas bubbles towards the surface, and also removing NAPL by evaporation into the growing bubbles, and wherein non-volatile NAPL is also mobilized by the gas, (c) directing the gaseous phase containing NAPL vapours and the NAPL mobilized by the rising gas bubbles to the recovery system, and (d) recovering the NAPL.

This invention takes advantage of the high volatility of the NAPL's and the spreading of NAPL over water in the presence of gas when NAPL held in pores of a porous medium in contact with water is contacted by gas. However, instead of injecting only gas, a gas dissolved in liquid, e.g. water at supersaturated concentrations, is introduced into the NAPL contaminated aquifer region. This permits the recovery of both 1) the NAPL liquid phase lifted by rising bubbles at the water-air interface (water table) and 2) the volatilized NAPL from the produced gas phase at the surface. The gas supersaturated liquid may be provided by the method and apparatus used in our prior U.S. Pat. No. 6,209,855. The disclosure of this patent is incorporated herein by reference. The method according to the invention involves a combination of theoretically sound mass transfer principles with the new Gas inFusion™ technology as described in our U.S. Pat. No. 6,209,855, that provides for the efficient injection of gas supersaturated liquids.

DETAILED DESCRIPTION OF THE INVENTION

By injecting water supersaturated with gas into the porous medium, the problems of gas fingering is minimized. When a gas-supersaturated liquid enters a porous medium, gas evolution occurs due to the laws of thermodynamics. Gas evolves within the porous network in places where capillary forces would otherwise not allow an injected gas to enter. The gas evolved in-situ actually assists the flow of the gas-upersaturated water to displace the groundwater held in small pores because the isolated gas bubbles in larger pores reduce the permeability of the relatively large pores and cause water to flow into regions of lower permeability.

Under appropriate conditions, NAPL ganglia can spontaneously spread over water in the presence of gas—a phenomenon that greatly increases the interfacial area for mass transfer of NAPL into the gas phase by evaporation. This phenomenon was verified experimentally (see FIGS. 3 and 4) in capillary pore network micromodels etched on glass. The experiments were performed in micromodels where a capillary porous network is etched between two glass plates. The growth of bubbles, the spontaneous spreading of NAPL over water in the presence of gas and evaporation of the NAPL was seen. The NAPL used in these experiments was Trichloroethylene (TCE) and $CO_2$ was the gas used because of its high solubility in water. It will be appreciated by those skilled in the art that other gases could also be used as the carrier gas e.g. air or $O_2$. The presence of dissolved oxygen in the ground water will be beneficial to enhance the bioremediation activity for depletion of residual NAPL.

Figure 1:
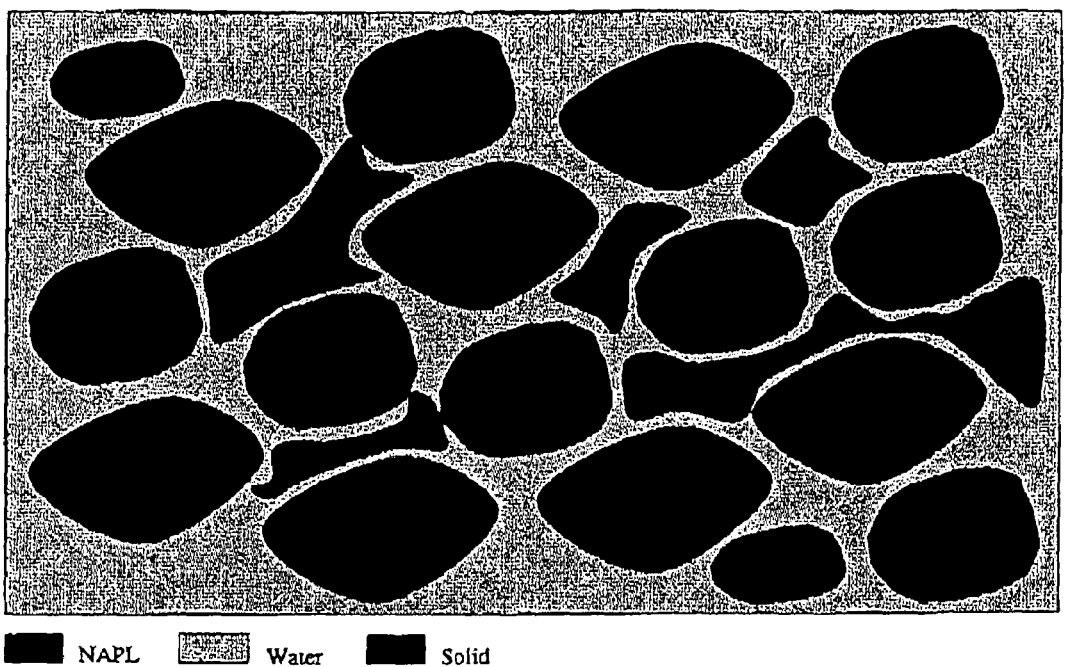
FIG. 1 is a schematic drawing of NAPL trapped in porous media below water table.
Figure 2:
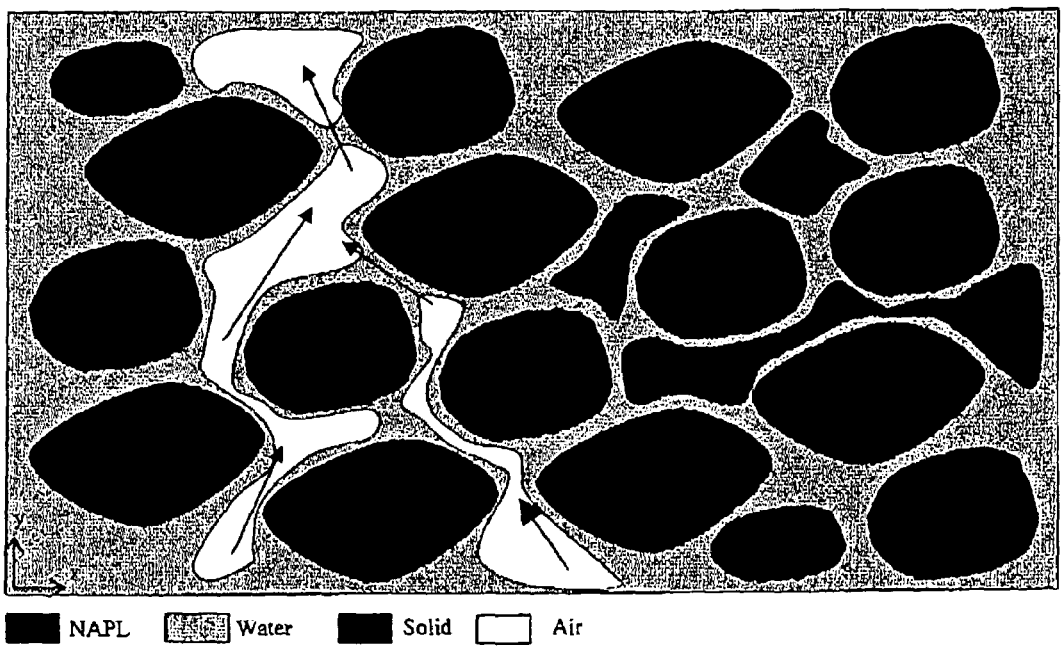
FIG. 2 is a schematic drawing of residual NAPL bypassing which results during air sparging.
Figure 3:
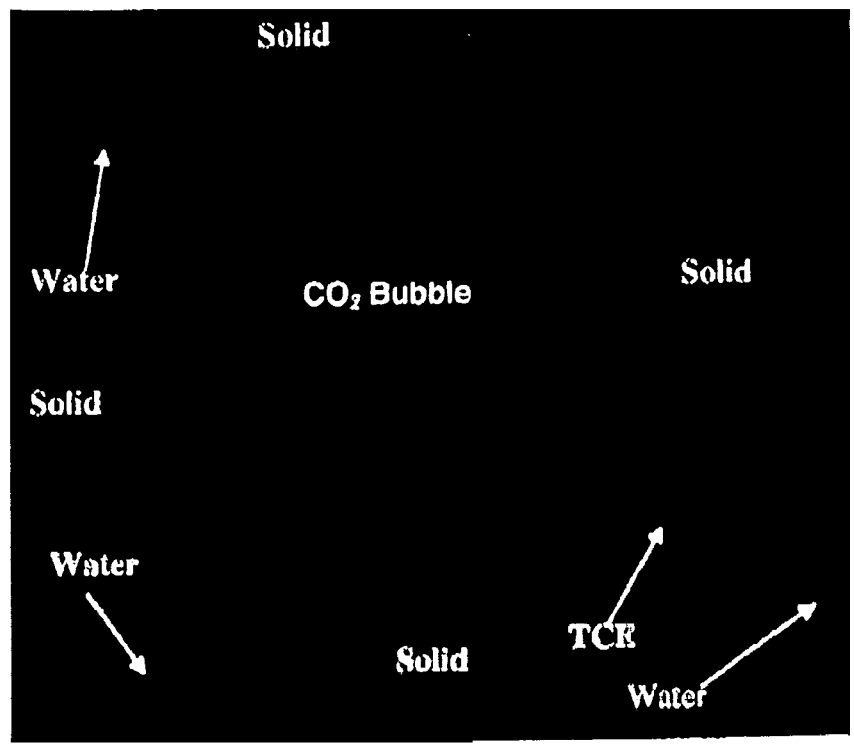
FIG. 3 is a drawing of spontaneous spreading of TCE over a CO2 bubble within a pore in a transparent glass micromodel.
Figure 4:
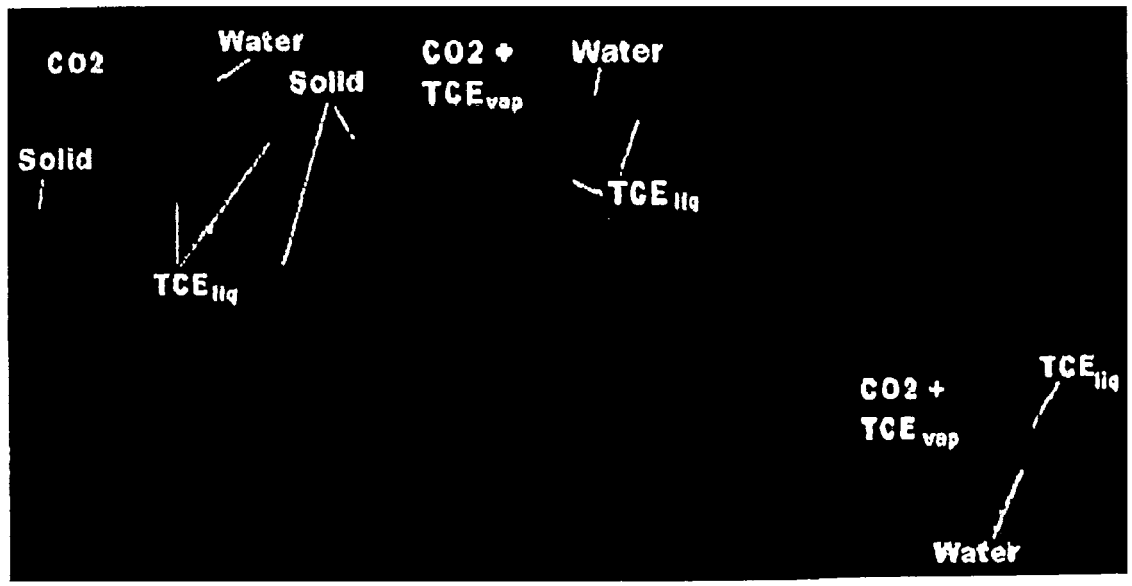
FIG. 4 is a series of drawings showing spreading of TCE over water in the presence of gas, evaporation of TCE and bubble growth within a pore in a glass micromodel.

FIGS. 3 and 4 are actual pictures during the micro model experiments mentioned above. The spreading of NAPL over a gas bubble can be seen in FIG. 3. In FIG. 4 a $CO_2$ bubble is growing by transfer of $CO_2$ mass from the gas-supersaturated liquid and the gas phase. When the bubble comes in contact with the TCE, the TCE spreads over the bubble and it evaporates due to its high volatility, at the same time increasing the size of the bubble. When the bubble grows big enough, the buoyancy forces exceeds the capillary forces and the bubble migrates upwards toward the surface.

Figure 5:
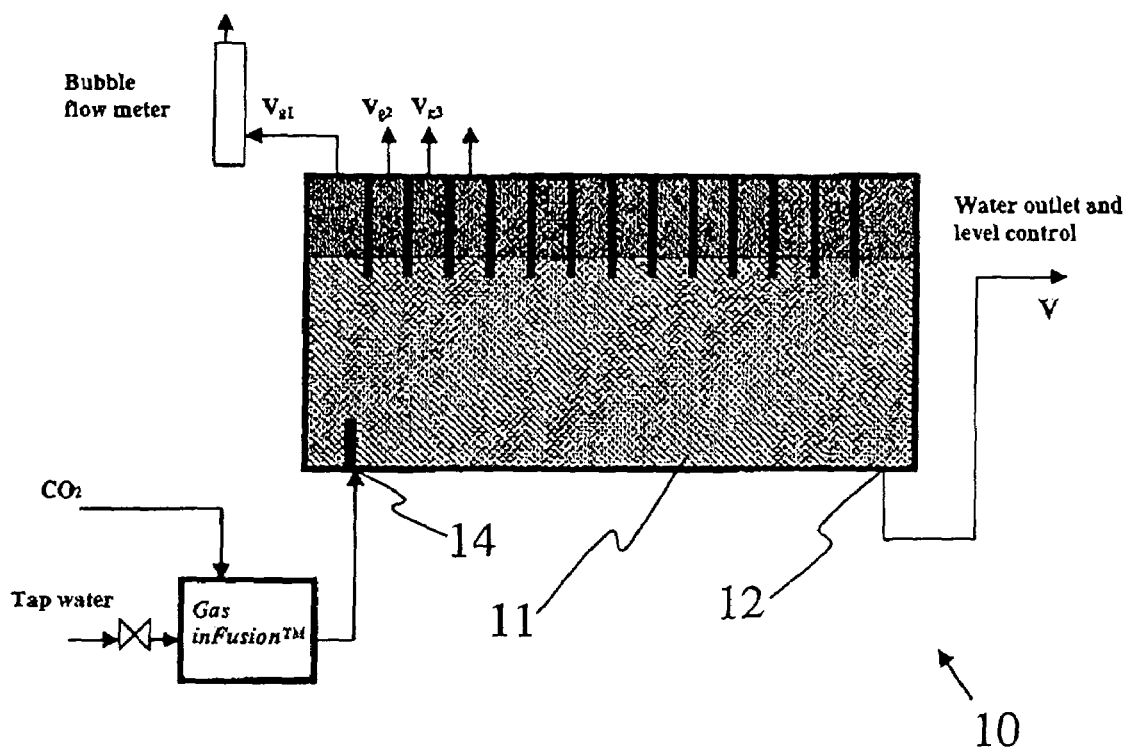
FIG. 5 is a drawing of the experimental setup of the gas evolution experiment.

Bubble nucleation is a function of pressure decay rate and number of nucleation sites within a porous medium. Pressure drop will occur due to flow and hydrostatics. This condition allows for dissolved gas to come out of solution in a porous medium everywhere that the supersaturated water displaces the resident water. To show this, an experiment was performed where water supersaturated with $CO_2$ was injected using a gas infusion module as per our U.S. Pat. No. 6,209,855, into a 25 cm long box 10 packed with a bed of porous media 11 (glass beads). A diagram of the experiment is shown in FIG. 5. The water level at the outlet 12 had to be adjusted by a valve $V_W$ in order to control the water level in the apparatus. Near the start of the experiment, at a flow rate of 120 $cm^3$/min, the elevation of the outlet tubing was 11 cm below the water level at the inlet 14. When the system had reached steady state, the height difference was 40 cm, indicating a change in the overall relative permeability of the porous medium to water. The change in relative permeability was due to the increase in gas saturation within the porous medium as gas evolution occurred.

Figure 6:
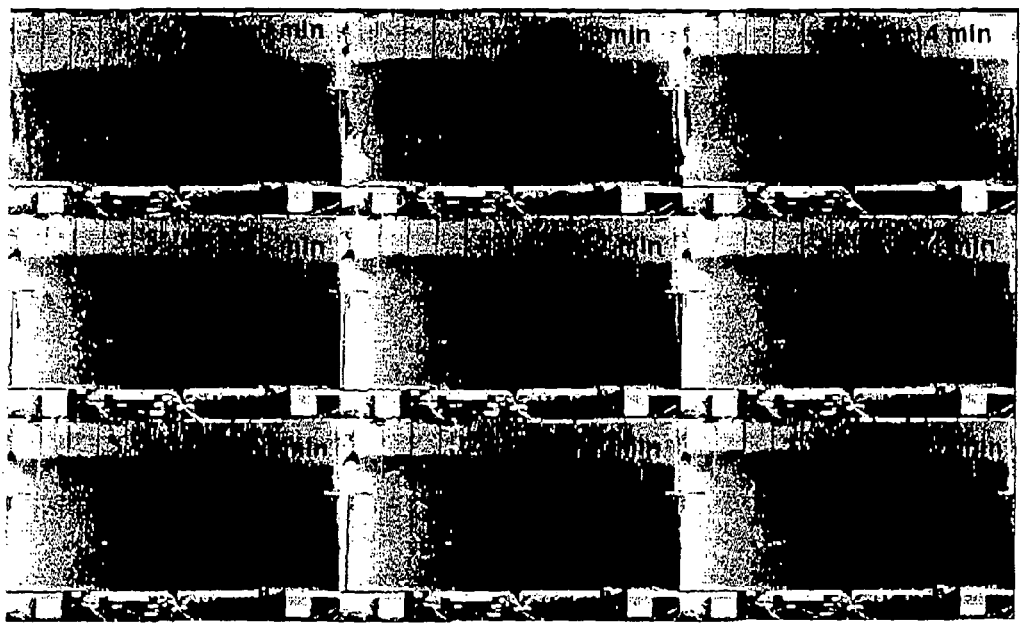
FIG. 6 is a series of drawings obtained from a gas evolution experiment showing the appearance of bubbles over a meter away from point of injection of water supersaturated with carbon dioxide.

Pictures of the transient gas evolution period were taken as a function of time and are shown in FIG. 6. These pictures were taken with a GI operating pressure of 32 psi and flow rate of 120 $cm^3$/min. The advancement of the gas in the porous medium in FIG. 6 is shown as different shades of grey in the photos. The gas invaded zones are a lighter gray in the photographs. The advancement of the gas front was also manually sketched by enlarging the photos and observing the colour contrast in the porous medium to help the visualization. Gas can be seen to evolve over the entire length of the 125 cm box in about 60 minutes. The gas appears to evolve uniformly as a front from the injection to the extraction end of the box. The maximum distance of gas evolution could not be determined in these experiments. It was also apparent that there was higher gas saturation closer to the injection well than further away. This was evident by the colour contrast from the left to right (injection to extraction) side of the photo at 60 minutes. The injection of a similar flow rate of air (as in air sparging) in the porous medium only showed gas invasion of approximately 10 cm, regardless of time.

Figure 7:
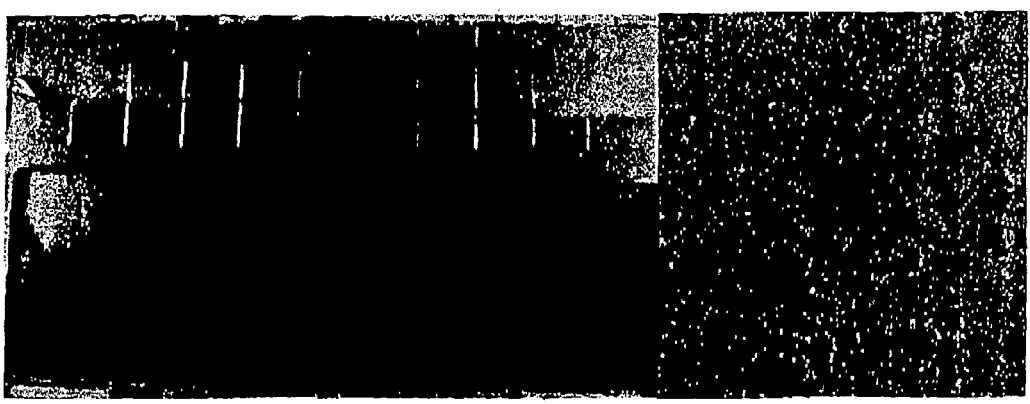
FIG. 7 is a series of drawings showing dyed residual hexane in the porous medium (packing of glass beads) 70 cm away from carbonated water injection point.
Figure 8:
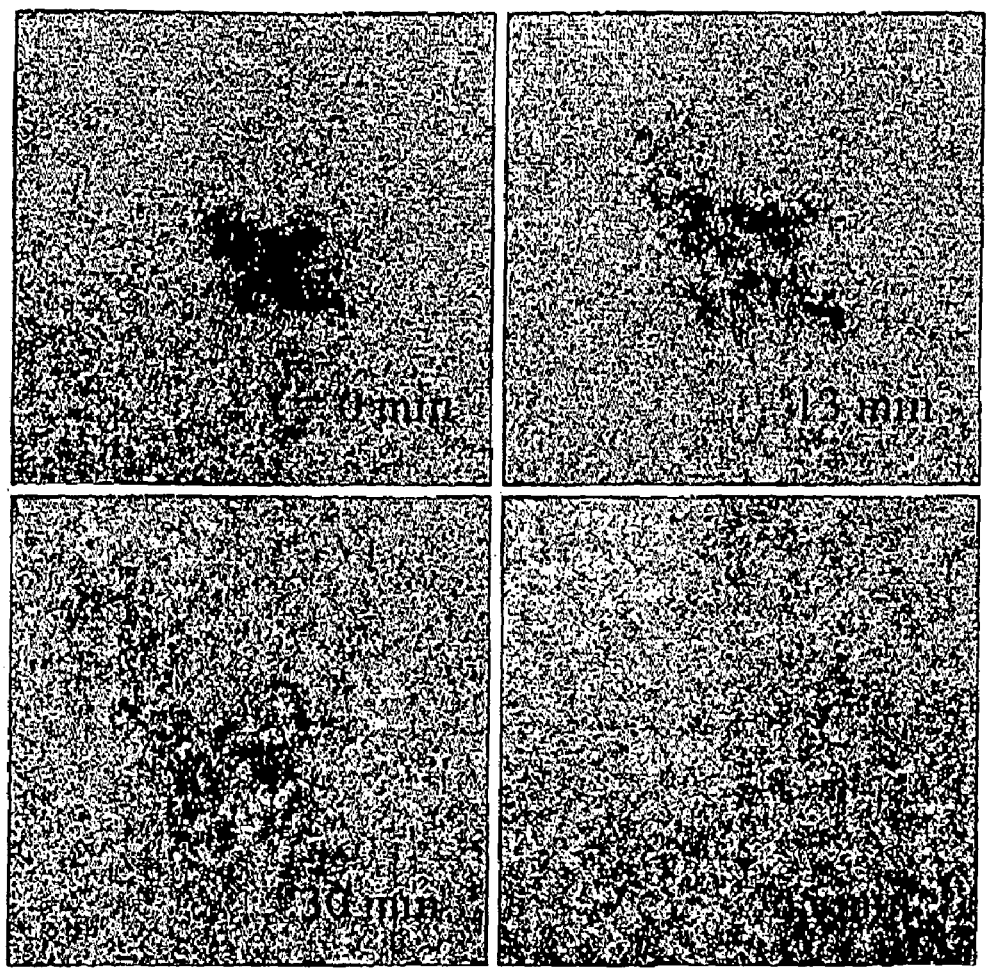
FIG. 8 is a series of drawings detailing NAPL removal by supersaturated water injection.

3 mL of hexane dyed red was injected with a long syringe from the top of the sand box model 70 cm away from the injection point. The residual NAPL can be seen as labelled in FIG. 7. The NAPL was injected prior to carbonated water injection. The oil shown in darker central portion in the picture is simply for better visualization of the NAPL removal. FIG. 8 shows the removal of the NAPL over time.

Figure 9:
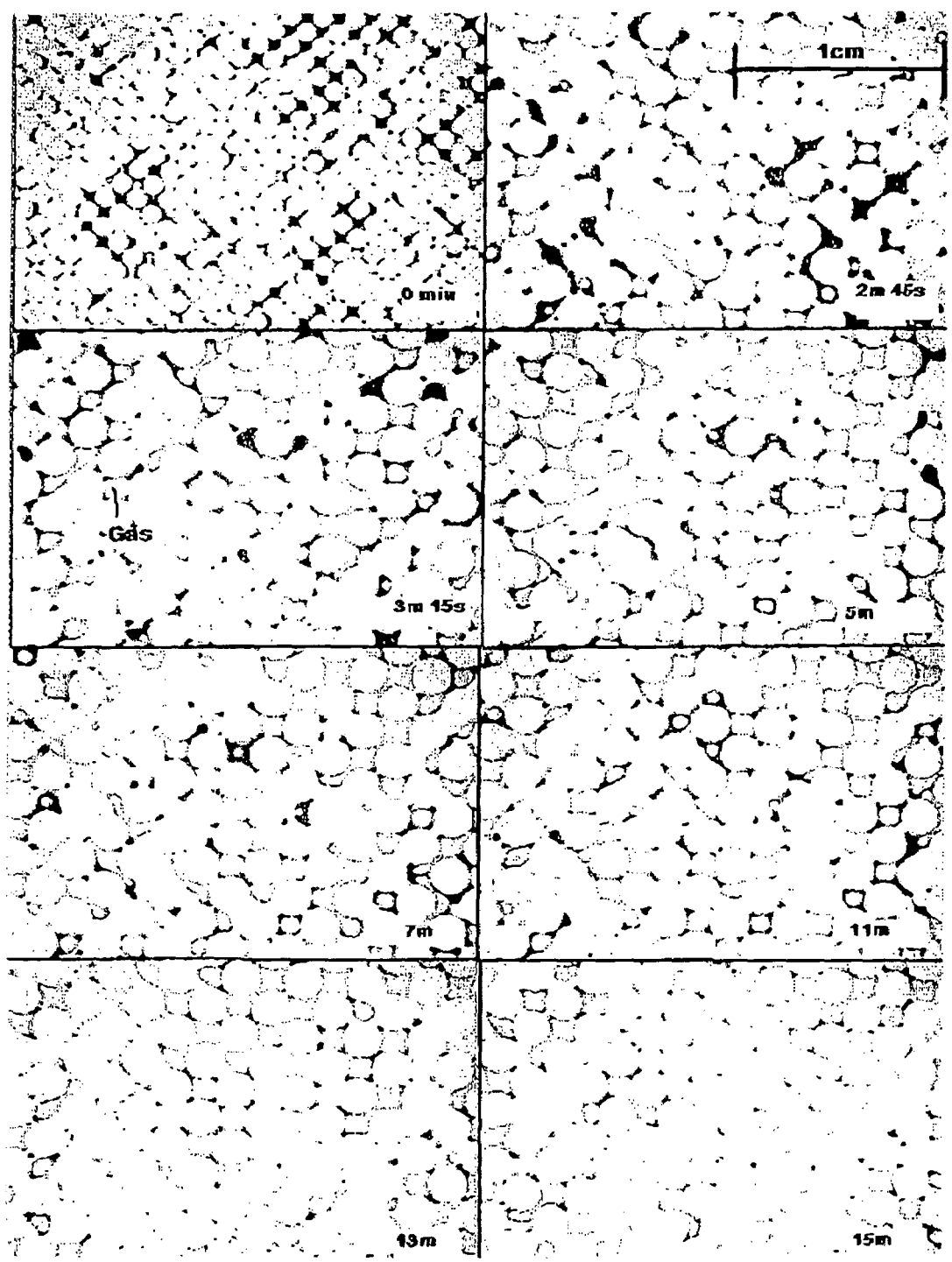
FIG. 9 is a series of drawings illustrating mobilization of NAPL (shown in black) by upward motion of $CO_2$ bubbles generated in situ at various times in a glass micromodel.
Figure 10:
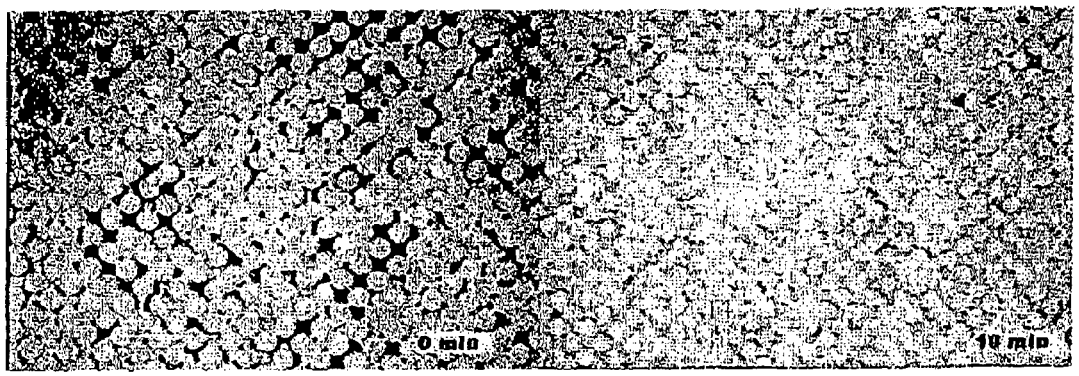
FIG. 10 is a series of drawings providing a visual comparison of the initial state of residual NAPL to the NAPL remaining in the glass micromodel after 16 minutes of carbonated water injection.

In addition to the volatilization of NAPL by the growing gas bubbles, another mechanism for remediation was observed. The spreading of the NAPL over the gas phase leads to the mobilization of the NAPL film as the bubbles rise to the surface. When the bubbles rise and break at the top of the water table, a free phase of NAPL is produced above the water table. This recovery mechanism was verified in a glass micromodel experiment. The micromodel was initially saturated with water and residual dyed Soltrol 100 (black), a non volatile NAPL (seen in FIG. 9 at time=0 min). Water supersaturated with carbon dioxide was then injected into the micromodel. The reduction of the non-volatile NAPL can be seen over time in FIG. 9. After ten pore volumes of water or 15 minutes of injection, approximately 95% of the NAPL has been removed by bubble mobilization alone. Residual NAPL before and after the recovery are compared in FIG. 10.

Figure 11:
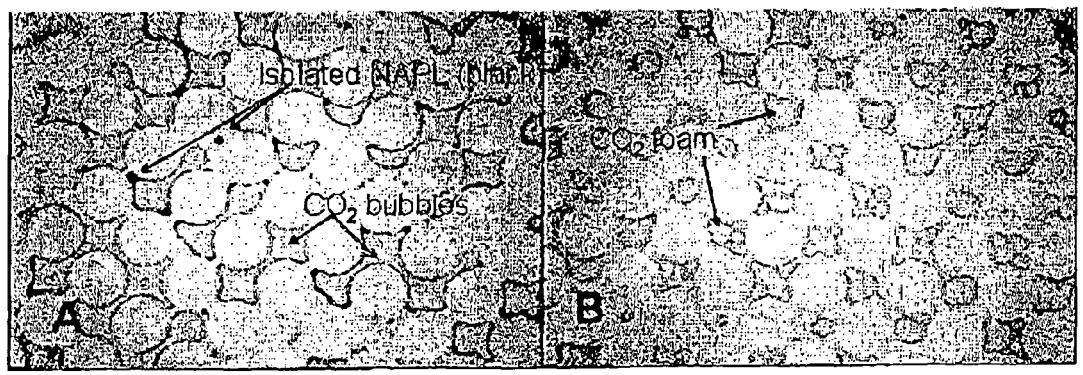
FIG. 11 illustrates further recovery of residual NAPL by introduction of surfactant in carbonated water: (A) Isolated NAPL residual before introduction of surfactant (close up of final state shown in FIG. 10), (B) final state after in situ generation of $CO_2$ foam which removed all remaining NAPL.

It can also be seen that small isolated amounts of NAPL remain in some of the pores after carbonated water injection (FIG. 11A). A small amount of surfactant was injected into the carbonated water inlet to generate a foam in-situ. The surfactant is a surfactant that meets US regulatory authority approval for use in aquifers. Surfactants of the family of polyoxyethylene sorbitant monooleates, as disclosed in L Zhong et al., Journal of Contaminant Hydrology 60 (2003) 55-75, the disclosure of which is incorporated herein by reference, have been found to be useful. The foam interface created has a stronger affinity to the NAPL than the solid surface. It can be seen in FIG. 11 that all the remaining NAPL is removed after just seconds of introducing the surfactant foam.

The bubble mobilization mechanism is further enhanced by the addition of a small amount of surfactant. The addition of the small amount of surfactant continuously generates foam in the porous network in-situ. The continuous generation of foam is a novel discovery and is a superior method to existing foam flooding technologies because of the higher gas sweep efficiency of the Gas inFusion™ technology. The production of free phase NAPL with this remediation technology allows for this technology to be applied to spill-sites that have both volatile and non-volatile NAPL.

Figure 12:
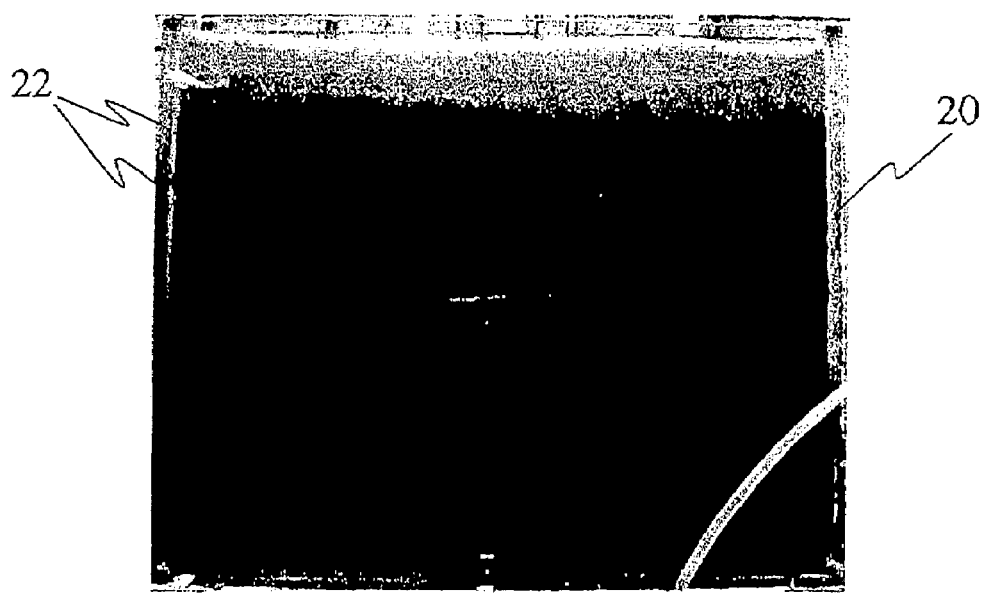
FIG. 12 is a drawing of the experimental setup used to demonstrate gas evolution within heterogeneous porous media (heterogeneity in the form of impermeable barriers)
Figure 13:
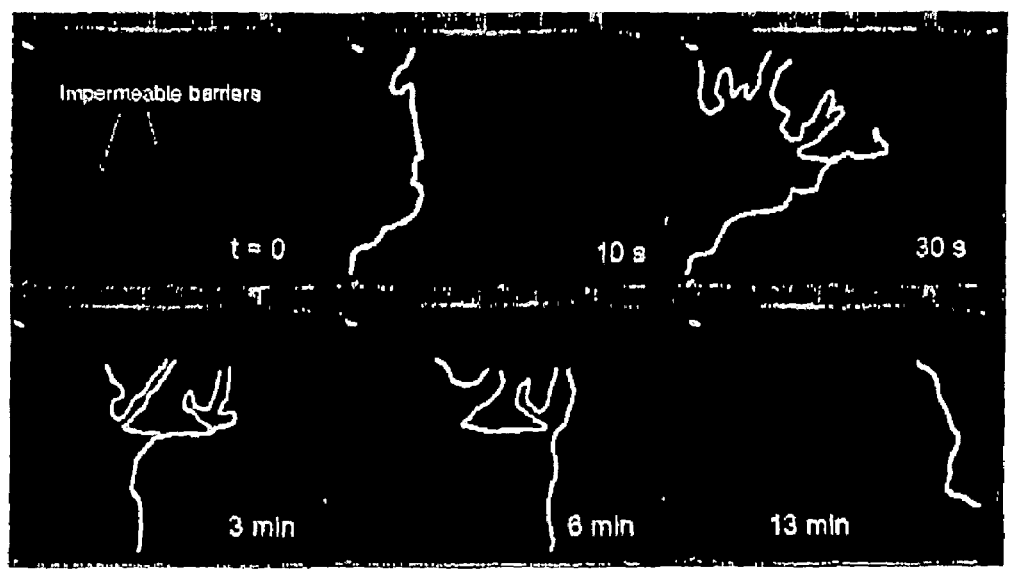
FIG. 13 is a series of drawings of gas evolution profiles within the heterogeneous porous medium at various times.

Since NAPL recovery by gas injection is severely influenced by heterogeneities in porous media, it was of interest to examine if the SWI process would be affected. The experiment is the same as the gas evolution experiments described in the previous section except it was performed in a smaller rectangular box with dimensions 38 cm long by 40 cm high by 2.5 cm wide, as seen in FIG. 12. Heterogeneities in the porous medium were introduced by placing two horizontal metal plates 22 in the box during the packing process to simulate impermeable layers. Carbonated water was injected at a rate of 55 mL/min with the same stainless steel injection tubing packed with medium sand with a permeability of 54 Darcy. This experiment was set up to demonstrate the effects of heterogeneity on the sweep efficiency of the gas phase introduced by the SWI process. Digital pictures of the heterogeneous model were taken at various times during the experiment and are shown in FIG. 13. It was observed that early on, gas evolves and rises as free gas and gas flow paths are formed. Similar to air sparging, the air pathways divert themselves around the impermeable layers. As the front of carbonated water travels from left to right of the photo, a front of bubble nucleation develops throughout the length of the model, consistent with the results seen in FIG. 6. It can be seen that as the system approaches steady state gas saturation, the heterogeneities have no effect on gas evolution in the system.

Figure 14:
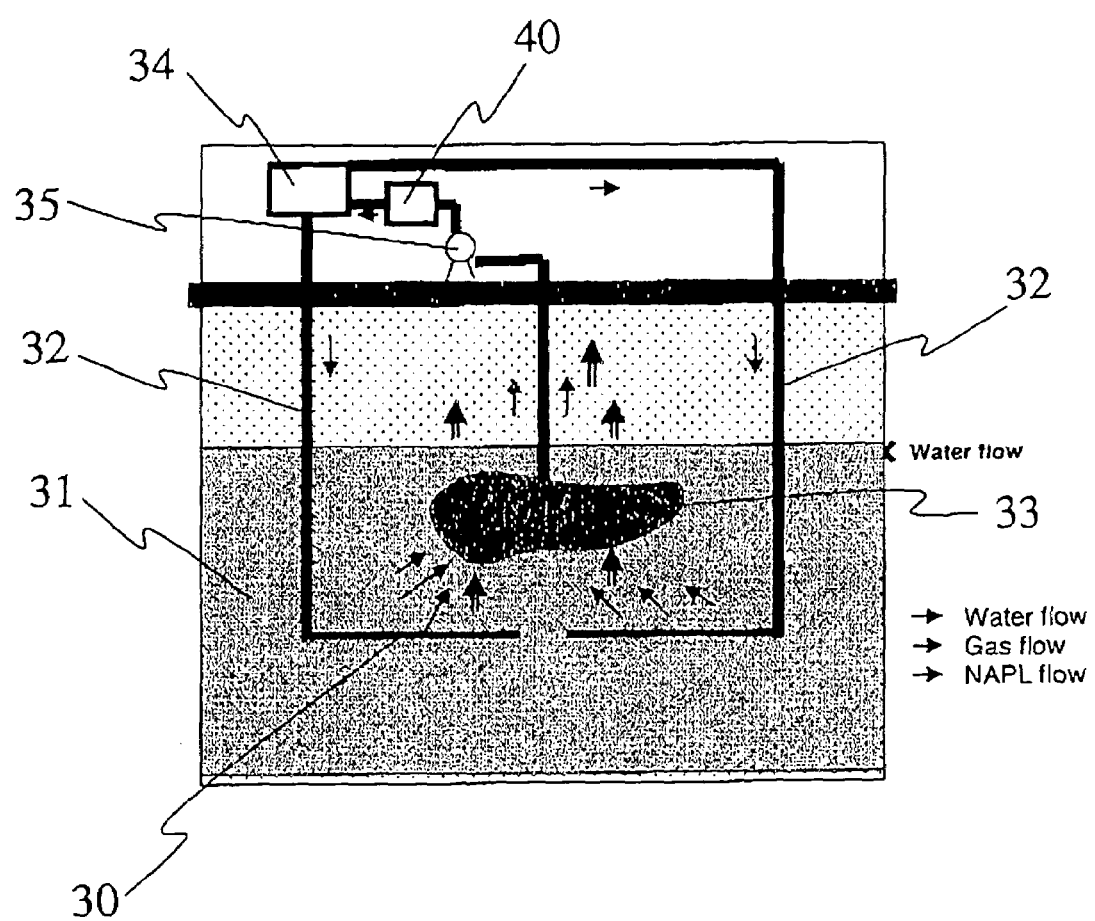
FIG. 14 is a drawing of conceptual implementation of NAPL recovery technology by supersaturated water injection.

Regarding implementation in the field, according to one embodiment of the invention, the gas-supersaturated liquid is injected below the NAPL contaminated source using horizontal and vertical wells. A conceptual schematic of the implementation is seen in FIG. 14.

The implementation involves the injection of gas-supersaturated water from a source 34 with dissolved gas e.g. $CO_2$ below the NAPL contamination source 33 using a grid of horizontal or deviated wells 30 from a common injection vertical well 32. Both the vertical and horizontal wells include a perforated section for injecting the gas supersaturated liquid to contact all of the NAPL-contaminated groundwater source. The pressure of the injected water is higher than the hydrostatic pressure at the depth of horizontal well so that some gas nucleation occurs immediately when the gas supersaturated water enters the porous medium 31, driven by pump 35. Gas-supersaturated liquid injection points are provided to deliver the gas supersaturated liquid to the contaminated region, while minimizing degassing prior to the liquid entering the porous medium. As the gas-supersaturated water flows radially and in the upward direction, the hydrostatic pressure decreases, facilitating bubble nucleation. Radial injection of the gas-supersaturated water is also applied in the perforated vertical section of the well 32 to ensure supersaturated water is present at all of the NAPL contaminated region. Eventually, when the bubbles with mobilized NAPL grow big enough, they will rise to the surface along with evaporated NAPL, where a recovery system 40 is used to recover the NAPL. Process enhancements such as intermittent let down of pressure in the well or gas sparging assist in the recovery process. Further enhancement involves the use of different gases such as oxygen and/or alkane gas to promote biological activity. Also, the addition of a surfactant to the gas supersaturated water leads to the formation of foam from bubble nucleation. The surfactant increases the interfacial affinity of the NAPL to the gas-liquid interface and aids in the NAPL mobilization process.

The invention claimed is:

1. An apparatus for recovering non-aqueous phase liquids (NAPL) from a contaminated ground water region, comprising, a system to supply a gas-supersaturated liquid, a system of wells drilled into the ground such that they are in fluid communication with the contaminated ground water region and with an above-ground NAPL recovery system, said system of wells including an injection well in fluid communication with the system to supply gas-supersaturated liquid and with the contaminated ground water region, an extraction well in fluid communication with the contaminated ground water region and with the NAPL recovery system, and a pump for delivering the gas-supersaturated liquid through the injection well to the vicinity of the contaminated ground water region, wherein the injection well comprises a vertical well, which extends into the ground to the vicinity of the contamination source, the vertical well including a perforated portion and wherein the injection well additionally comprises a horizontal or deviated section extending below the contamination source, the horizontal section including a perforated portion, the perforations in both the vertical and the horizontal sections including injection points to deliver gas supersaturated liquid, while minimizing degassing prior to the liquid contacting the contaminated ground water region.

2. A method for recovering non-aqueous phase liquids (NAPL) from a contaminated ground water region comprising,
(a) providing a system to supply gas supersaturated liquid, a system of ground wells in fluid communication with the contaminated ground water region and with an above-ground NAPL recovery system, said system of wells including an injection well in fluid communication with the system to supply gas supersaturated liquid and with the contaminated ground water region, an extraction well in fluid communication with the NAPL recovery system and a pump for delivering the gas-supersaturated liquid to the vicinity of the contaminated ground water region,
(b) injecting the gas-supersaturated liquid into the vicinity of the contaminated ground-water region through the gas injection well, wherein the NAPL is held in the pores of a porous medium in the contaminated groundwater region, resulting in the flow of the gas-supersaturated liquid to displace the NAPL held in the pores via lifting some of the NAPL by rising gas bubbles towards the surface, and also removing NAPL by evaporation into the growing bubbles, and wherein non-volatile NAPL is also mobilized by the gas,
(c) directing the NAPL containing gaseous phase and the NAPL mobilized by gas to the recovery system, and
(d) recovering the NAPL.

3. A method according to claim 2, wherein the gas supersaturated liquid additionally comprises a suitable surfactant.

4. A method according to claim 3, wherein the surfactant is a polyoxyethylene sorbitant monooleate.

5. A method according to claim 2, wherein the gas supersaturated liquid is injected below the NAPL contaminated source.

6. A method according to claim 2, wherein the pressure of the injected supersaturated liquid is higher than the hydrostatic pressure at the point of injection.

7. A method according to claim 2, wherein the liquid is water.

8. A method according to claim 2, wherein the gas is air, oxygen, $CO_2$ or an alkane.

9. A method according to claim 2, wherein the NAPL comprises petroleum products or chlorinated solvents.

10. A method according to claim 2, wherein the NAPL comprises trichloroethylene.

11. A method according to claim 2, wherein the method is continuous.

12. A method according to claim 2, wherein NAPL is recovered in the form of free-phase NAPL and as volatilized NAPL in the gas phase produced.

* * * * *